United States Patent [19]

Bella et al.

[11] Patent Number: 4,542,499
[45] Date of Patent: Sep. 17, 1985

[54] DISTRIBUTED CONTROL SYSTEM FOR MULTIPLE RANDOM ACCESS TO THE TRANSMISSION LINE OF A LOCAL NETWORK FOR SPEECH AND DATA

[75] Inventors: Luigi Bella, Turin; Roberto Brignolo, Settimo Torinese; Giulio Barberis; Maurizio Sposini, both of Turin, all of Italy

[73] Assignee: cselt centro studi e Laboratori Telecomunicazioni SPA, Turin, Italy

[21] Appl. No.: 425,858

[22] Filed: Sep. 28, 1982

[30] Foreign Application Priority Data

Oct. 20, 1981 [IT] Italy .............................. 68352 A/81

[51] Int. Cl.[4] ........................... H04J 3/02; H04J 6/00; H04J 3/00
[52] U.S. Cl. ....................................... 370/85; 370/94; 370/91
[58] Field of Search ...................... 370/85, 89, 95, 94, 370/93, 91

[56]  References Cited

U.S. PATENT DOCUMENTS

| 3,846,587 | 11/1974 | Schenkel et al. | 370/85 |
| 3,851,104 | 11/1974 | Willard et al. | 370/85 |
| 3,859,465 | 1/1975 | Schenkel et al. | 370/85 |
| 3,959,594 | 5/1976 | Srivastava | 370/95 |
| 3,963,870 | 6/1976 | Couder et al. | 370/85 |
| 4,154,983 | 5/1979 | Pedersen | 370/89 |
| 4,234,952 | 11/1980 | Gable et al. | 370/85 |
| 4,375,097 | 2/1983 | Ulug | 370/94 |
| 4,402,073 | 8/1983 | Hammond | 370/85 |
| 4,432,088 | 2/1984 | Frankel | 370/85 |

OTHER PUBLICATIONS

B. Lübben et al., "Signalling in a Decentralized Subscriber Stage", ISS 1979, May 1979, pp. 1240-1245.
Tobagi, "Multiaccess Protocols in Packet Communication Systems", IEEE Trans. of Comm., vol. Com-28, No. 4, Apr. 1980, pp. 468-488.
L. West, "Carrier Sense Subset Multiple Access System", IBM Tech. Disc., vol. 22, No. 11, Apr. 1980, pp. 4811-4812.
D. Bantz et al., "Decentralized Bus Architecture with Collision Retry", IBM Tech. Disc., vol. 23, No. 2, Jul. 1980, pp. 858-861.
H. Miyahara et al., "Flexible Multiplexing Technique with Two Types of Packet for Circuit and Packet Switched Traffic", Trans. of IECE of Japan, vol. E64, No. 6, Jun. 1981, pp. 390-397.
K. Tomaru et al., "A Worldwide Integrated Service Communication System for Voice and Non-Voice", ITE and Symposium, Sep. 1981, pp. 45-47.
National Telecommunications Conference, vol. 2 of 4, Nov. 30-Dec. 4, 80, NY (US) D. L. Giovachino: "A High Speed Packet Switched Local Network", pp. 41.1.1 to 41.1,5.
Proceedings of the Fifth International Conference on Computer Communication, Atlanta, Oct. 27-30, 1980. G. C. O'Leary: "Local Access Area Facilities for Packet Voice", pp. 281 to 286.
European Search Report App. No. 0077563, EP 82 10 9637, dated Jan. 18, 1983, The Hague, Examiner: R. J. Wanzeele.
"A Carrier Sense Multiple Access Protocol for Local Networks", (Author: Simon S. Lam, Computer Networks, 4 (1980) 21-32).
"Performance Analysis of Carrier Sense Multiple Access with Collision Detection" (Fouad A. Tobagi and V. Bruce Hunt, Computer Networks, 4 (1980) 245-259).

Primary Examiner—Douglas W. Olms
Assistant Examiner—Wellington Chin
Attorney, Agent, or Firm—Karl F. Ross; Herbert Dubno

[57]  ABSTRACT

The system allows the implementation of packet-switched synchronous speech communications in the network without requiring any centralized device synchronizing all the network stations. To obtain that, the active periods of each station are subdivided into frames each having a duration equal to the time elapsing between the generation to two subsequent speech packets relating to the same communication; once a station has accessed the line for the speech communications, these communications are allotted time slots which are maintained for the whole communication duration. The slots not allotted to speech communications are allotted to data transmission. The access to the line for a speech communication is obtained by the same contention techniques used also for data transmission.

5 Claims, 12 Drawing Figures

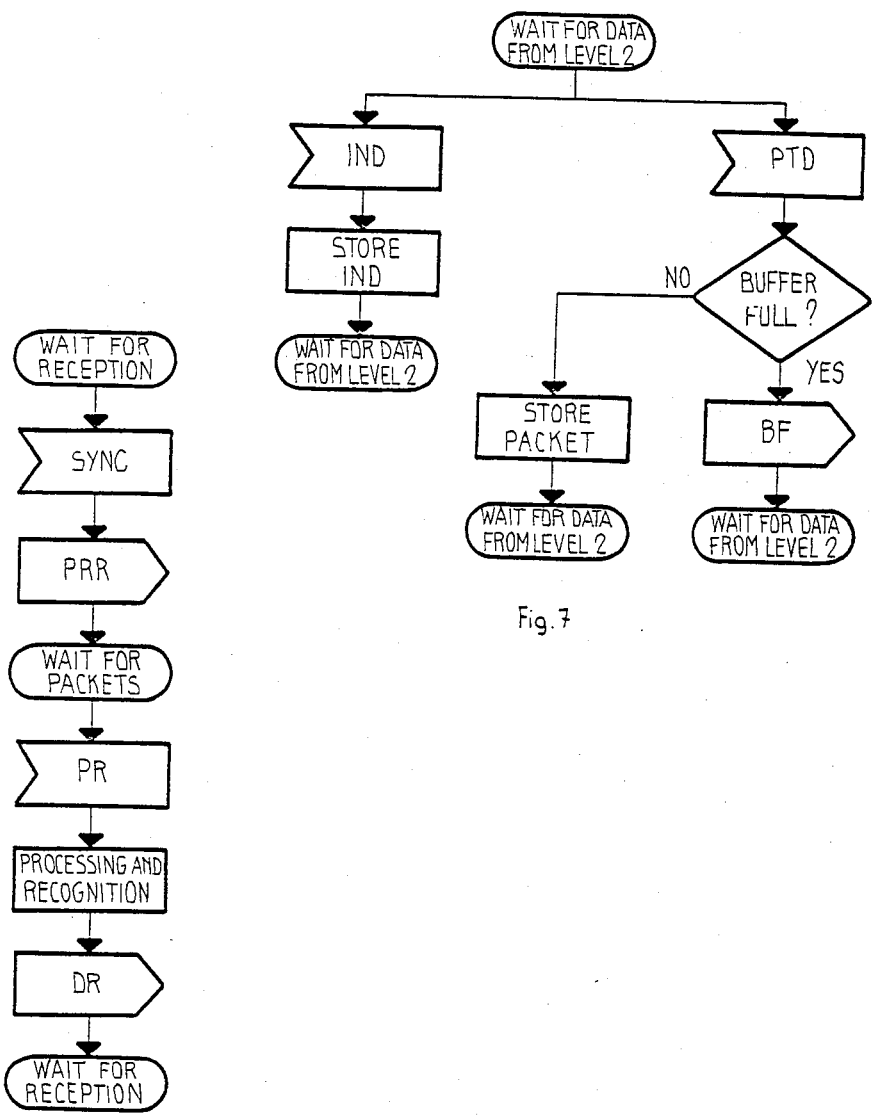

ical networks", i.e. communications networks able to interconnect a large number of stations or terminals in a restricted area. More particularly the invention relates to a system for the accessing of a plurality of stations or terminals, capable of transmitting both data and speech, to a transmission line in one of such networks in which the information is transmitted in packet form.

DISTRIBUTED CONTROL SYSTEM FOR MULTIPLE RANDOM ACCESS TO THE TRANSMISSION LINE OF A LOCAL NETWORK FOR SPEECH AND DATA

BACKGROUND OF THE INVENTION

The present invention relates to the so-called "local-networks", i.e. communications networks able to interconnect a large number of stations or terminals in a restricted area. More particularly the invention relates to a system for the accessing of a plurality of stations or terminals, capable of transmitting both data and speech, to a transmission line in one of such networks in which the information is transmitted in packet form.

FIELD OF THE INVENTION

Packet-switched local networks were originally designed for data transmission only; however the present technique is oriented to use such networks also for speech transmission and therefore network topologies, access systems and transmission procedures suitable for both types of traffic are necessary.

It is known that for packet-switched data transmission networks and for distances less than 1 km, the most widely used topology comprises a wide-band bus (consisting of an optical fiber or a coaxial cable), which different terminals can access according to contention (or random multiple access) techniques, such as the one known as CSMA (carrier-sense multiple access).

In these systems each terminal can send its message to the network at any instant, provided the line is not busy; in that case the transmission is rescheduled for a subsequent instant. As the line occupation by a terminal becomes known to the other terminals with a certain delay due to the propagation time, collisions, i.e. substantially simultaneous access requests, can arise; the collisions are resolved by suitable procedures, well known in the art, owing to which the packets involved in the collision are retransmitted after a suitable and random delay.

Said systems are preferred because they do not require any centralized device synchronizing all the network stations. Consequently their construction is simpler and their operation more reliable, as they do not present the reliability node formed by the synchronism system.

Should the network be used also for speech transmission, speech packets would be subjected to collisions and retransmissions like data packets. Therefore, they would undergo transmission delays varying from packet to packet, which delays would cause at the reception side a degradation of the voice quality which strongly depends on the synchronism characteristics. This degradation could be tolerated inside a private network but cannot be accepted when the communication is to be routed onto the public network.

To meet these speech synchronism requirements the solutions so far proposed to allow the use of local networks also for speech transmission are based on methods requiring a central synchronism, such as the TDMA (Time-Division Multiple Access), wherein frames are built up in which each terminal is allotted its own time slot. In this way the advantages of circuit simplicity and reliability typical of contention access systems are sacrificed to speech transmission quality requirements.

OBJECT OF THE INVENTION

It is an object of the invention to provide an access system for speech and data transmission which both offers the advantages typical of the contention access systems and satisfies the speech synchronism requirements.

Our present invention provides a process for multiple random access to a transmission line in a local network for data and speech transmission, comprising a plurality of stations which mutually exchange information through said line in packet form, characterized in that at each station, under the exclusive control of a local timing system, the station octivity is organized into frames whose duration is equal to the time elapsing between the generation of two consecutive packets relating to the same communication of a kind requiring maintenance of synchronous characteristics (speech communications) and, during each frame, the speech communications are allotted time slots equal to the duration of transmission of a packet which time slots are reserved to said communications for their whole duration, thus implementing synchronous communication channels; characterized also in that a timing map of the line occupation by the synchronous channels is built up at every frame at each station independently, only monitoring the transmission line and in that the frame periods not allotted to active synchronous channels are utilized both for communications which do not require the synchronous characteristics to be maintained (data communications) and for the booking of further synchronous channels by each station, the time slots which may be allotted to synchronous channels forming a predetermined and not exceedable fraction of a frame duration.

BRIEF DESCRIPTION OF THE DRAWING

The characteristics of the invention will be better understood from the following description of a preferred embodiment, given by way of example and not in a limiting sense, depicted in the annexed drawings, in which:

FIGS. 5a, 5b, 6a, 6b, and 7 to 10 are flow-charts of the operations carried out by the device.

SPECIFIC DESCRIPTION

Figure 1:
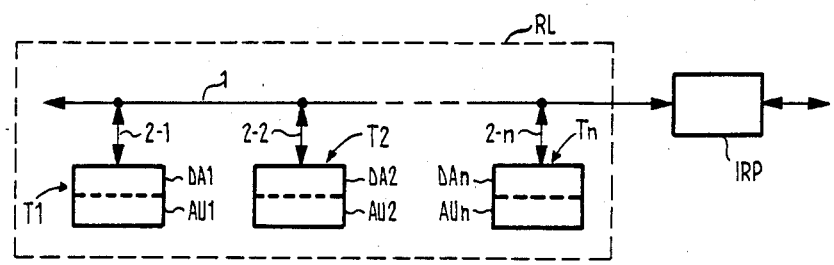
FIG. 1 is a schematic representation of a local network.

In FIG. 1 a local network RL comprises a high-speed bus 1 to which a plurality of stations or terminals T1, T2 ... Tn are connected through lines 2-1 ... 2-n. Each station comprises the actual speech and data subscriber sets AU1, AU2 ... AUn and the device DA1, DA2 ... DAn for the access to the network according to contention techniques. An interface IRP connects the local network to the public network (not shown).

Subscriber sets AU1 ... AUn of stations T1 ... Tn can consist e.g. of the whole of the computing resources and telephones belonging to the served area.

Bus 1 can be realized by any physical transmission media, e.g. a copper or optical fiber cable, and its nature has no importance to the purposes of the invention. However the invention finds its most advantageous utilization in the cases in which bus 1 is unidirectional; the reasons for this will be expounded later on.

Devices DA1, DA2 . . . DAn, which form the object of the invention, should allow the transmission of speech and data packets on the bus so that the synchronous characteristics of the speech are maintained without requiring a centralized synchronization of the terminals; in this way the advantages present in the contention access techniques are maintained.

To obtain that, according to the present invention a timing map of the line occupation by speech communications is built up at each terminal, which map is continuously updated and has a duration equal to the time elapsing between the generation of two consecutive speech packets relating to the same communication. Such time, which owing to speech characteristics is to be constant, will be hereinafter referred to as a "frame". Since speech packets must have a fixed duration the map can be easily implemented by memorizing the instants of beginning and end of the speech packet transmission. Such a map will be used for each new speech communication or for data packet transmission, thereby controlling the access of the station to the bus. Data packet transmission or new telephone calls will take place at instants not allotted to the packets of ongoing speech communications. In this way, if the network operates correctly, only data packets or packets designed to book the line for a speech communication can undergo collisions, i.e. packets which do not require the maintenance of synchronous characteristics.

A correct memorization of the line state is to be referred to the point of transmission on the bus.

In case of a bidirectional bus, the transmission and reception points coincide and therefore the map built up at the reception coincides with that available for the transmission. However, the bus being bidirectional, the actual propagation delays depend on the relative terminal position, which is generally unknown; therefore, the end of the transmission by a terminal must precede the actual instant of detection of the activity on the bus by a time equal to twice the maximum propagation delay in the bus, in order to take into account the most unfavorable condition (packet starting from one end and addressed to the other end); these guard times can be of the same order of magnitude as the time required to transmit a packet at the line rate and then they can be very heavy. A delay equal to twice the actual propagation time between the involved stations could be possibly introduced, if such time was known, but this would entail, at each terminal, reading the starting address of each packet and, in case of network modifications, would require reinitialization of the whole system.

In the case of unidirectional bus the transmission and reception points of a terminal are separate; in this case however the propagation delay between transmitting and receiving points is fixed and can be determined while initializing the terminal, so that it is easy to recover the transmission map from the map built up at the receiving point by simply "anticipating" the instants memorized by a time equal to said delay; consequently there is no necessity to introduce guard times to take into account propagation delays, and therefore the bus exploitation is greatly improved.

Booking packets for a telephone call must be as long as the actual speech packets, so as to provide a slot for that call in the frame. Once the booking packet has been transmitted over bus 1, the speech packets will be transmitted in the subsequent frames during the same time slot previously occupied by the booking packet.

Of course no problems arise if that time slot was allotted to data transmissions in the previous frames, since, as already stated, such transmissions do not require maintenance of time correlations. If the booking packets collide, the retransmission procedures commonly used in the contention access techniques are utilized.

From what is stated above, it comes out that telephone transmissions have a certain priority with respect to data transmissions. However, considering frames with a duration of some ten milliseconds (say, 20 ms), packets built up of a thousand bits and transmission rates on the bus of some tens Mbit/s (e.g. 30 of Mbit/s), the transmission of a packet takes some ten microseconds (about 30 $\mu$s, with the data considered), so that even in case of heavy speech traffic, the 20 ms frame has space enough for data transmissions; when necessary, an upper limit can be established for the number of telephone calls.

Figure 2:
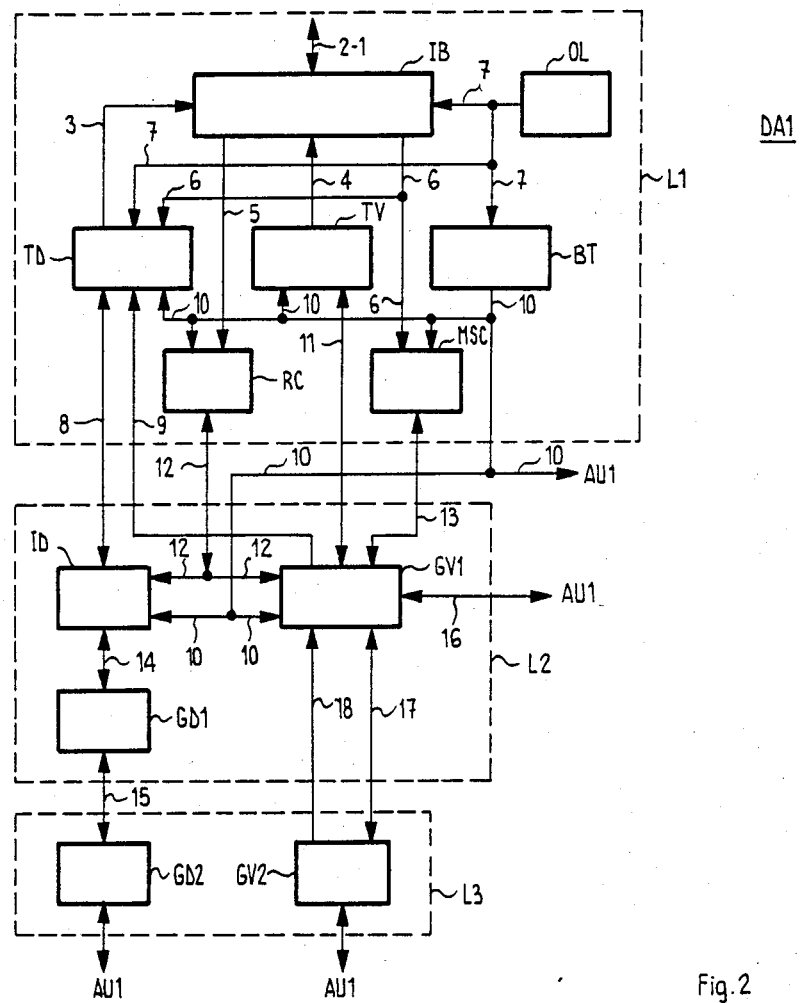
FIG. 2 is a block diagram of the access device in a terminal.

In FIG. 2, in conformity with the usual representations of the access systems implementing internationally standardized data transmission protocals (e.g. the CCITT X25 protocol), access device DA1 has been subdivided into three hierarchical levels, schematically represented by blocks L1, L2, L3. The first level, shown in detail as it is the most concerned by the present invention, performs as a logic and physical interface with the bus; the second level is entrusted with the control and supervision of the connection, while the third manages the calls, as to speech, and the packets, as far as data are concerned.

More particularly, the tasks of block L1 are:
(a) serial digital transmission and reception on the wide-band bus;
(b) local synchronization;
(c) real-time reconstruction of the line occupation by speech communications;
(d) reception and temporary storage of the packets (speech and data) addressed to the station;
(e) speech packet transmission management, so that the transmission takes place at the instants established by the higher hierarchical level (block L2);
(f) data packet transmission management, so that the transmission takes place in the zones not allotted to speech packets and according to the access system and protocal chosen; by way of example reference will be made to CSMA-CD system (carrier sense multiple access with collision detection).

It is to be mentioned that operations a, d, f (as to the part relating to CSMA) are identical to those provided at level 1 of a standard data transmission protocol.

To perform these tasks, block L1 comprises, from a functional standpoint, an interface IB for connection to bus 1, the circuits managing data and speech transmissions (blocks TD, TV), a receiver RC for data and speech packets, a memory of the line state, MSC, a local oscillator OL and a time base BT timing the operations inside the terminal.

Interface IB, which is connected to bus 1 through line 2-1, receives from blocks TD and TV, through connections 3, 4, data and speech packets to be sent to bus 1 upon a suitable modulation, and through connection 5 it transfers to receiver RC, upon suitable demodulation, the packets addressed to the terminal it belongs to. Besides, IB sends to data transmitter TD and to memory MSC, through connection 6, control signals relating to the line state (in particular beginning and end of carrier and collision detection). The operations of IB are timed by local oscillator OL (connection 7).

Data transmitter TD receives from block L2, through connections 8, 9, and stores the data packets to transmit and the indications of the time slots in which such transmission is possible, and manages data transmission with the modalities required by a CSMA-CD system. In addition TD sends to block L2, through a wire of connection 8, a signal indicating that it is ready to receive the packets.

For its operations TD receives suitable timing signals from time base BT (connection 10).

Speech packet transmitter TV receives from block L2, through connection 11, and stores speech packets to be transmitted the related indications of the beginning time instants of the periods allotted to such transmissions, and effects in such periods IB. Also TV is controlled by time base BT through signals present on connection 10.

Receiver RC receives in real time from interface IB through connection 5, the packets addressed to the terminal it belongs to and transfers them to block L2 through connection 12. This transfer occurs upon request by the higher hierarchical level.

Memory MSC builds up in real time on a frame by frame basis the busy period map necessary for the higher levels to receover in each frame the time slots allotted to speech packets. To this aim MSC receives from interface IB the signals emitted on connection 6 and relating to the events occurred on the line, and from BT the information on the time instants relating to the events communicated by interface IB, and sends to L2, through connection 13, the busy-state map relating to the preceding frame. Also the information stored in MSC is transferred upon request of the higher hierarchical level.

Time base BT receives from local oscillator OL, through wire 7, the fundamental clock signal and generates the local time references which are supplied to the other blocks of L1 or to the higher levels through connection 10. In particular time base BT is to supply a pattern which indicates, with the precision of the signal generated by OL, the current time instant within the frame, and to supply the frame synchronism and the synchronism requested by the speech on the input channels.

The circuit implementation of a number of functional blocks of L1 will be described with reference to FIGS. 3, 4.

As to the higher hierarchical levels L2, L3 of the access device, they can be functionally subdivided into a first part implementing the higher levels of the data protocol chosen (blocks GD1, GD2, in L2, L3) and another part managing the telephone calls (blocks GV1, GV2). L2 comprises also an interface ID connecting block DG1 and the data transmission devices in L1.

Interface ID is to recognize data packets in the packet flow arriving from RC and to send them to GD1 through connection 14. In the opposite direction ID receives from GD1 and transfers to L1 the data packets. The operations of ID are synchronized by time base BT through signals sent over connection 10.

Block GD1 operates in a way similar to what established for the systems which do not employ common-bus topologies, therefore its operation requires no detailed description. Line 15 schematizes the connection between GD1 and GD2.

As to the ongoing telephone calls, at each frame GV1 recognizes in the packet flow coming from RC the packets relating to such calls, forwards the actual speech packets to the various "channels" of AU1 (i.e. to the various subscribers connected to T1) and sends GV2 the control packets relating to the same calls. The opposite operations will be carried out for the packets to transmit.

To this purpose block GV1 comprises a memory storing the association between the time-slots allotted to speech in the frame and the subscribers.

As to new calls, GV1 is to ask MSC the line state and on the basis of such state is to book a time slot for the transmission; the association of such slot with the subscriber will be carried out in the memory only upon detection that no collisions occurred.

The connections of GV1 to the 1st level devices have already been examined. The connections of GV1 to the subscriber sets are schematized by line 16, comprising as many bidirectional "channels" as are the sets in AU1. The connections of GV1 to the control devices of the speech transmission in L3 are schematized by line 17, which conveys the control packets relating to incoming or outgoing calls, signals relating to the beginning and end of the outgoing calls as well as the possible control signals. A wire 18 used by L3 to signal the end of an outgoing call has been separately represented.

As to the third level, block GD2 carries out the tasks of the 3rd level of the data protocol, while block GV2 sets up and releases the calls and has the signalling tasks well known in telephony.

Blocks ID, GV1, GV2, GD1, GD2 can be implemented by a conventional computer.

The tasks of GD1, GD2 will not be described in further detail, as they are identical to those of the higher levels in the access protocols for data only.

Figure 3:
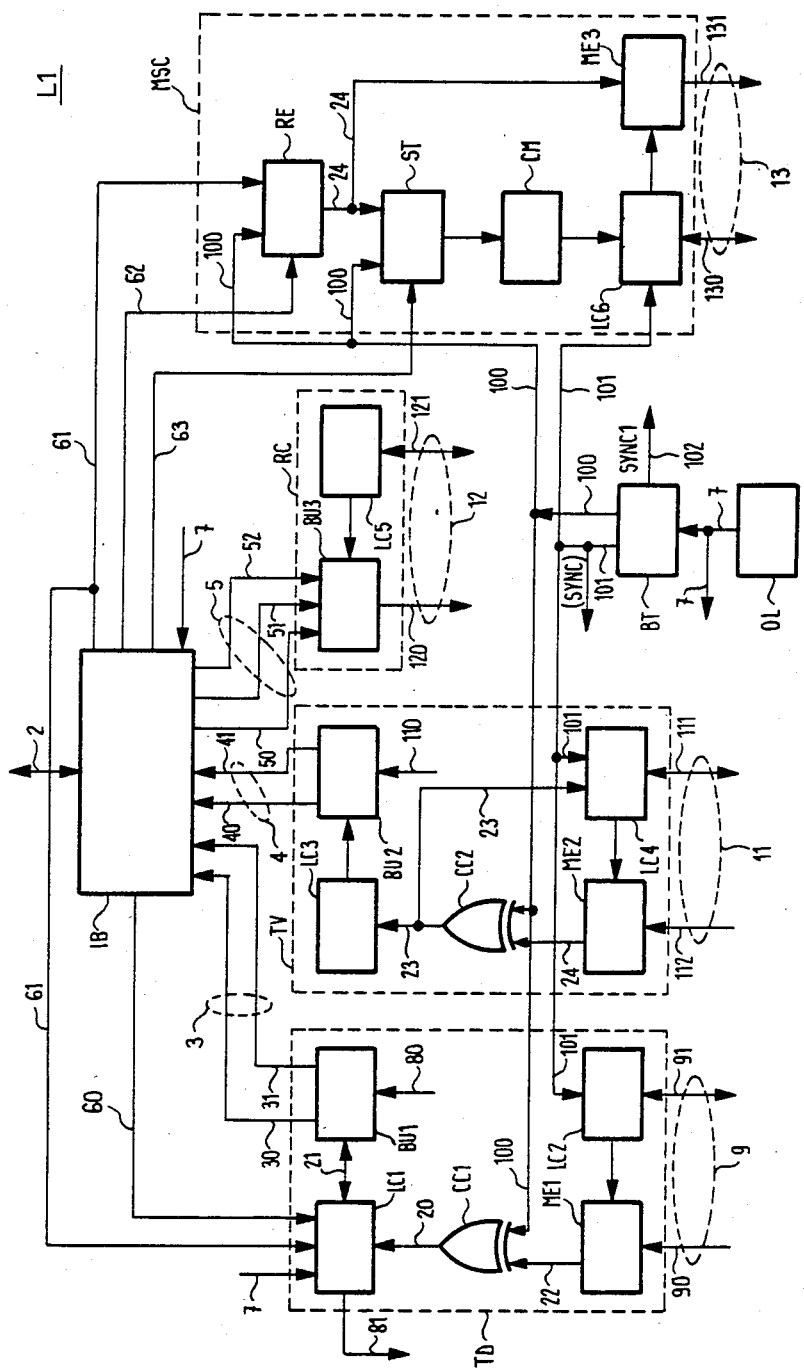
FIG. 3 is a circuit diagram in block form of the first hierarchic level of the access device.

In FIG. 3, block TD comprises a buffer BU1, e.g. of the FIFO type, which receives through wires 80 of connection 8 the data packets coming from ID (FIG. 2). These packets are then serially transferred to IB through connection 31 in cable 3 which comprises a further wire 30 for the control signals.

The packets are transferred to IB under the control of a logic network LC1, which controls the access to the bus according to the CSMA technique. More particularly LC1 causes the reading of BU1 (and therefore the transmission) in the absence of collisions and reschedules the transmission in case of collisions; in addition LC1 signals to the higher levels that the buffer is full (wire 81). LC1 is preset to operation by a signal indicating the presence of data packets to be transmitted (which signal is sent by BU1 through wires 21) and is enabled, in the time intervals not allotted to speech transmissions, by a signal ZD coming through a wire 20 by a coincidence circuit CC1, which will be described hereinbelow. In order to operate correctly LC1 receives from IB a signal indicating the busy state of the channel (signal BUSY transmitted on wire 60) and a signal indicating the occurrence of collisions (wire 61 of connection 6) and receives from OL the basic clock signal present on wire 7.

The connection between LC1 and BU1 is schematized by line 21.

The operations carried out by LC1 are well known to the person skilled in the art, hence they need not be described in further detail, see: "A carrier sense multiple access protocol for local network", by S. S. Lam, "Computer Networks, vol. 4 (1980), pages 21–32, or "Performance analysis of carrier sense multiple access with collision detection" by F. A. Tobagi and V. Bruce Hunt, ibid., pages 245–259.

The coincidence circuit CC1, here represented by way of example as an Exclusive-OR gate, receives from a memory ME1, through a connection 22, bit patterns denoting the instants of beginning and end of the frame periods available for data transmission, and from time base BT, through wires 100 of connection 10, the bit pattern denoting the current instant: in case of coincidence between the two patterns, CC1 sets or resets signal ZD, depending on whether the beginning or the end of the periods is concerned.

The information present on connection 22 is that supplied by block CV1 (FIG. 2) through wires 90 of connection 9 and stored in ME1 in the preceding frame.

Memory ME1 is a double-gate memory, wherein, as said, in a frame there is written the information necessary to the transmission of the data packets in the subsequent frame. To allow this writing and reading shifted by one frame, ME1 comprises for instance two identical elements: in each frame writing will take place in one element while the other element the information written in the preceding frame is read.

The circuits controlling the addressing, reading and writing in the memory are quite conventional and are here schematized by the block LC2, which controls also the dialog with the higher hierarchic levels, as schematized by connection 91. LC2 further receives through wire 20 the signal ZD which updates the reading address, and it is reset by the frame synchronism SYNC, it receives through wires 101 of connection 10.

Devices TV for speech packet transmission are realized substantially as those for data packet transmission. Buffer BU2 receives from the higher level the speech packets (wires 110 of link 11) and forwards them, together with the relative control signals, on connection 4, comprising wire 40 for the control signals and wire 41 for the packets.

Reading and writing in BU2 are controlled by a quite conventional control logic LC3. Reading is enabled by the output signal of a coincidence circuit CC2. Said signal is sent to LC3 through wire 23. Circuit CC2 receives from a memory ME2, through connection 24, signals INV indicating the time instants which, in the subsequent frame, are allotted to speech packet transmission, and from time base BT the pattern present on wires 100.

Memory ME2 is organized exactly like ME1 and is controlled by logic LC4, which is connected to the higher levels through connection 111. LC4 is advanced by the output signal of CC2 and is reset at each frame by the frame synchronism signal SYNC.

Receiver RC comprises a buffer memory BU3, whose output consists of wires 120 of connection 12, and a control logic LC5, which controls the operations of BU3 and exchanges with the higher levels the control signals PRC (wires 121).

Memory BU3 receives, through wires 50, 51, 52 of connection 5, a reception clock extracted from the received signals, an enabling signal and the actual information signals.

Finally, the memory of the line state MSC comprises the actual memory devices ME3, organized as ME2, control logic LC6, and means allowing the memorization of the instant of beginning of the transmission of each speech packet. As this transmission has a fixed duration, it can be easily recognized by comparing with such duration the time elapsing between the beginning and the end of transmission of a packet. To this aim a register RE is provided receiving from BT the signals present on connection 100 (pattern representing the current instant) and is enabled to store them at the instant established by the beginning-of-carrier signal (BOC) supplied by IB through wire 62 of connection 6. Output 24 of RE is connected to memory ME3 and to a first input of a subtractor ST, which has a second input connected to connection 100. ST is enabled to subtract the bit pattern present on connection 24 from that present on connection 100 at the instant established by the signal indicating the end of transmission.

The output of ST is connected to a comparator CM wherein the duration of a speech packet is preset; if such duration is equal to that computed by ST, CM enables LC6 to cause the writing in ME3 of the bit pattern present on connection 24, i.e. of the beginning instant of the transmission of that packet.

The data stored in ME3 in a frame are read in the subsequent frame and transferred to the devices of L2 (FIG. 2) through wires 131 of connection 13. Wires 130, also belonging to connection 13, schematize the connection between LC6 and the devices of L2 (FIG. 2) for the dialog necessary to the transfer of information to L2.

Register RE presents also a reset input at which it receives the signal of collision detected, transmitted by IB through wire 61. In case of collisions the bit pattern on wire 24 indicates 0, and by duly organizing the transmission (e.g. by never transmitting at instant 0) CM can be prevented from operating LC6.

Figure 4:
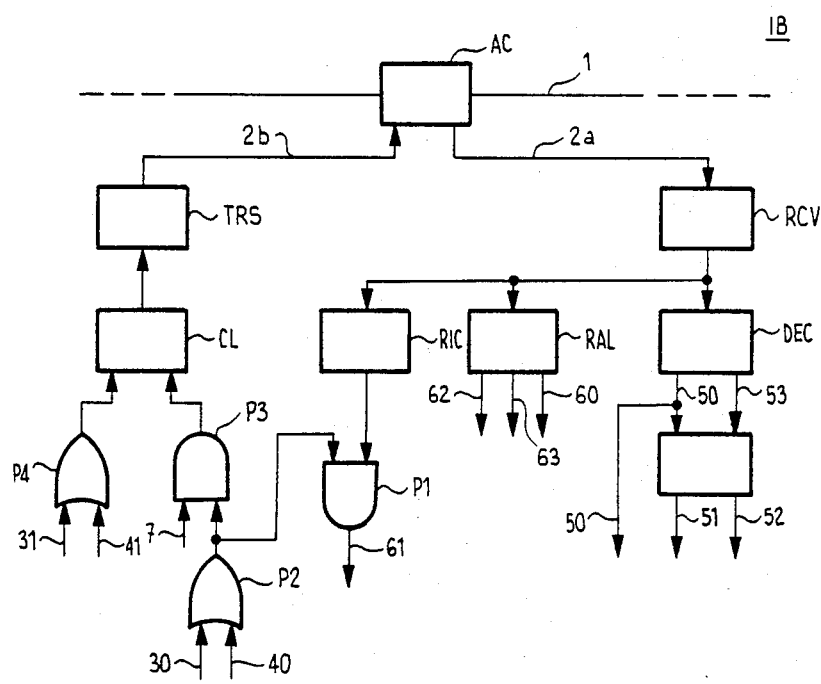
FIG. 4 is a block diagram of the interface of the first hierarchic level.

FIG. 4 shows a coupler AC inserted on bus 1 for extracting therefrom the signals addressed to the terminal and transmitting on the bus the signals originated in the terminal. The structure of coupler AC depends on the nature and organization of the bus, and therefore will not be described in detail since, as mentioned, the bus nature is of no interest to the invention; however, devices performing a coupler function, as AC are well known in the art. The only requirement is that coupler AC allows the detection of the activity of the terminal it belongs to.

Output wires 2a of coupler AC convey the signals to receiver RCV, which makes said signals available to the subsequent devices as digital signals containing also clock information. If the transmission on the bus is made in modulated form, receiver RCV effects the demodulation. The output of receiver RCV is connected to a circuit DEC decoding and extracting the clock information, to a detector RAL of the busy state of the line as well as to a collision detector RIC.

Clock decoder and extractor DEC supplies on a first output 50 reception clock (CKR) and on a second output 53 a binary information signal. The clock and the information signals are transferred to an address detector RIN which, when the packets are addressed to the terminal IB belongs to, emits on output 51 a signal (CVDR) which enables buffer BU3; speech or data packets are emitted by RIN on output 52.

The busy detector RAL has output wires 60, 62, 63 already examined. The operation of RAL depends on the kind of code used for the transmission, in particular RAL can detect the transitions or integrate the means activity. Supposing that transitions are detected, signals BOC and EOC are emitted at the first and last transition received, respectively. The busy signal is present between signals BOC and EOC.

Even for the structure of collision detector RIC different solutions are possible, depending on the modalities of transmission on the bus. More particularly RIC can detect the simultaneous occurrence of more transmissions on bus 1 with threshold systems (the power transmitted on a bus by a terminal is known and each increase denotes collisions) or by detecting the absence of the reception clock. The latter systems are based on the fact that in certain kinds of code, individual pulses present rigid phase correlations which are missing when a plurality of signals overlap.

Since the information on the occurrence of collisions is of interest only when the terminal is transmitting, the output of RIC is connected to an input of an AND gate P1, whose output is wire 61. P1 has a second input connected to the output of an OR gate P2, which has two inputs connected to wires 30, 40 of connections 3, 4 which comvey the control signals relating to speech or data packet transmissions, respectively.

The output of P2 forms also an input of a further AND gate P3, which receives at a second input the fundamental clock signal present on wire 7 and has the output connected to a line encoder CL which encodes in the desired way the packets to transmit. Said packets are supplied to CL through an OR gate P4, the two inputs of which are connected to wires 31, 41 conveying data and speech packets, respectively. The output of CL is connected to transmitter TRS, which has complementary tasks to RCV. TRS is connected through wires 2b to bus 1.

The operation of the apparatus will be now described, expounding first and in greater detail the case of the speech communications, with which the invention is mostly concerned.

For a telephone call, at the seizure by a subscriber of the local network, e.g. a subscriber connected to AUI (FIG. 1), the access device DA1 must first book within the frame a time slot with duration equal to that of the transmission of a speech packet, to be allotted to that call in the subsequent frames.

To this aim, device GV2 of L3, having detected the seizure, forwards to GV1 the request for the time slot (signal RCU); as a consequence GV1 requests L1 to send the contents of memory ME3 of MSC, i.e. it requests the map of the line occupation by the speech communications in the previous frame.

The way in which the map is built up has been previously described.

On the basis of the information stored in MSC, GVI chooses an available period, that is a time slot not allotted to other speech communications, and temporarily stores the association between the time slot and the subscriber, while waiting for acknowledgment of the successful booking.

The choice can theoretically concern any available slot, but in the practice a strategy will be adopted tending to optimize the exploitation of the band for both kinds of packets: for instance, the telephone calls can be grouped or distributed at regular intervals in the frame. The strategy adopted does not affect the scope of the invention.

Once the association between a subscriber and a time slot has been established, device GV1 sends the packet booking the transmission line to BU2 (FIG. 3) via wires 110 and sends the indication of the time instant in which the transmission ought to be attempted (signal INV) to ME2 via wires 112; then GV1 awaits the booking result.

In the subsequent frame, under the control of logic network LC4, the indication stored in ME2 is read and supplied to circuit CC2; when there is coincidence with the current instant, CC2 enables LC3 to cause the reading of the booking packet stored in BU2. This packet is sent to transmitter TRS (FIG. 4) in IB and hence onto bus 1.

The beginning of this transmission and possible overlaps between said transmission and those in progress (collisions) are recognized by circuits RAL and RIC in all the terminals (the transmitting terminal included): in the absence of collisions, the instant of beginning of the transmission is stored in ME3 (FIG. 3); otherwise signal CD is emitted which, as mentioned, inhibits such storage.

At the beginning of the subsequent frame, GV1 (FIG. 2), reads again ME3 to check whether the booking has been successful, i.e. whether the instant of occurrence of signal BOC has been stored in ME3.

In the opposite case (i.e. if a collision occurred or if the transmission has not been carried out because the line was busy) the described operations are repeated for another available time slot till the booking is successful or for a predetermined maximum time.

If the booking has been successful, that is no collisions occurred, the association between calling party and time slot is stored definitively by GV1 and an acknowledgment signal of the successful booking (RRCU signal) is sent to GV2. From the instant on, the time slot is definitively allotted to the subscriber for the whole call duration, and is made unavailable to other subscribers. Then GV2 sends the subscriber the dialling tone and waits for the dialling; while waiting GV1 sends one or more fictitious packets (i.e. packets without information contents) to L1 and then over the line in order to mantain the booking.

When the subscriber ends dialling GV2 forwards to GV1 a control or signaling packet containing the address of the called subscriber; said packet is sent over the line in the time slot booked, through the devices of L1. The address detector RIN (FIG. 4) of the interface IB of the called subscriber recognizes that said packet is addressed to the terminal it belongs to, and generates on wire 51 the enabling signal for memory BU3 (FIG. 3) which in this way can store the signaling packet it receives from RIN (FIG. 4) via wire 52.

In the subsequent frame, device GV1 of the called party reading in the memory BU3 detects the signalling and forwards it to level 3. The called subscriber's access device starts then the booking of a time slot for the transmission of the signalling and possibly of the conversation to the calling party, in the way described.

At the end of these procedures, if the called subscriber was free and could book a time slot in the frame, a logic bidirectional channel exists between the two subscribers connected and from that instant until the release a bidirectional communication channel is available to both subscribers. While transmitting, at each frame the subscribers send onto the line at the predetermined instant their speech packets in the same way as for the booking packet(s); while receiving, each subscriber receives the packets addressed to him. To this aim at each frame the content of memory BU3 is read by GV1 that, recognizing the packets relating to speech communications (e.g. on the basis of a bit whose logic value distinguishes speech from data) fowards the control or signalling packets to the higher hierarchical level (GV2) and the actual speech packets to subscriber set AU1.

At the end of the transmission, the release will take place according to the standard telephone procedures; in addition, in correspondence with the release, a suitable signal is emitted by device GV2 of each subscriber, so as to cancel in the memory of GV1 the association subscriber-time slot and to inhibit forwarding further transmission requests to the level 1. The lack of packets transmitted onto the line is automatically interpreted by the other stations, without any specific information, as the clearing of the connection and the corresponding time slot is made available for asynchronous data traffic.

Obviously the operations described here for a call are carried out in parallel for all the other calls originating from the same station.

Figure 5A:
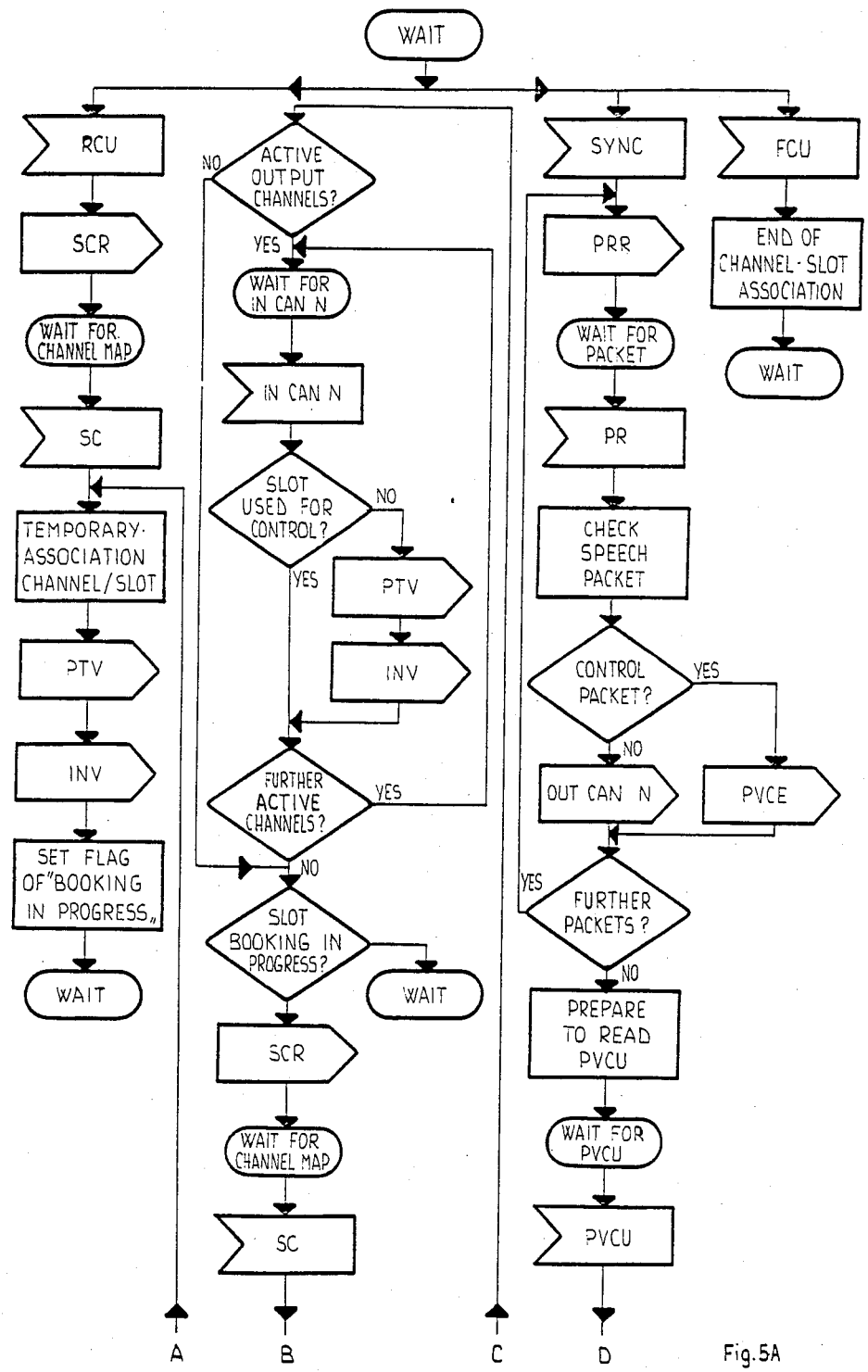
Figure 5B:
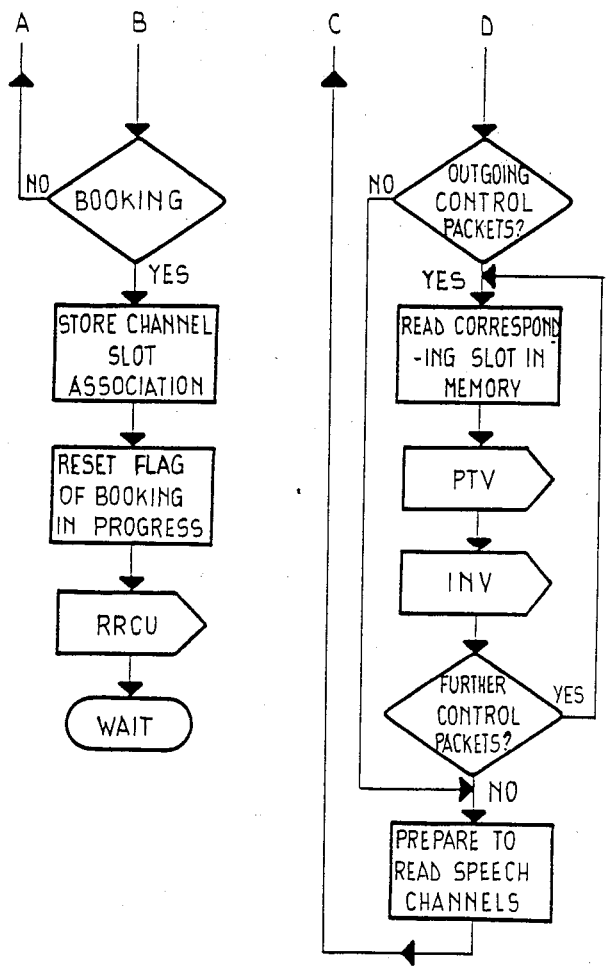
Figure 6A:
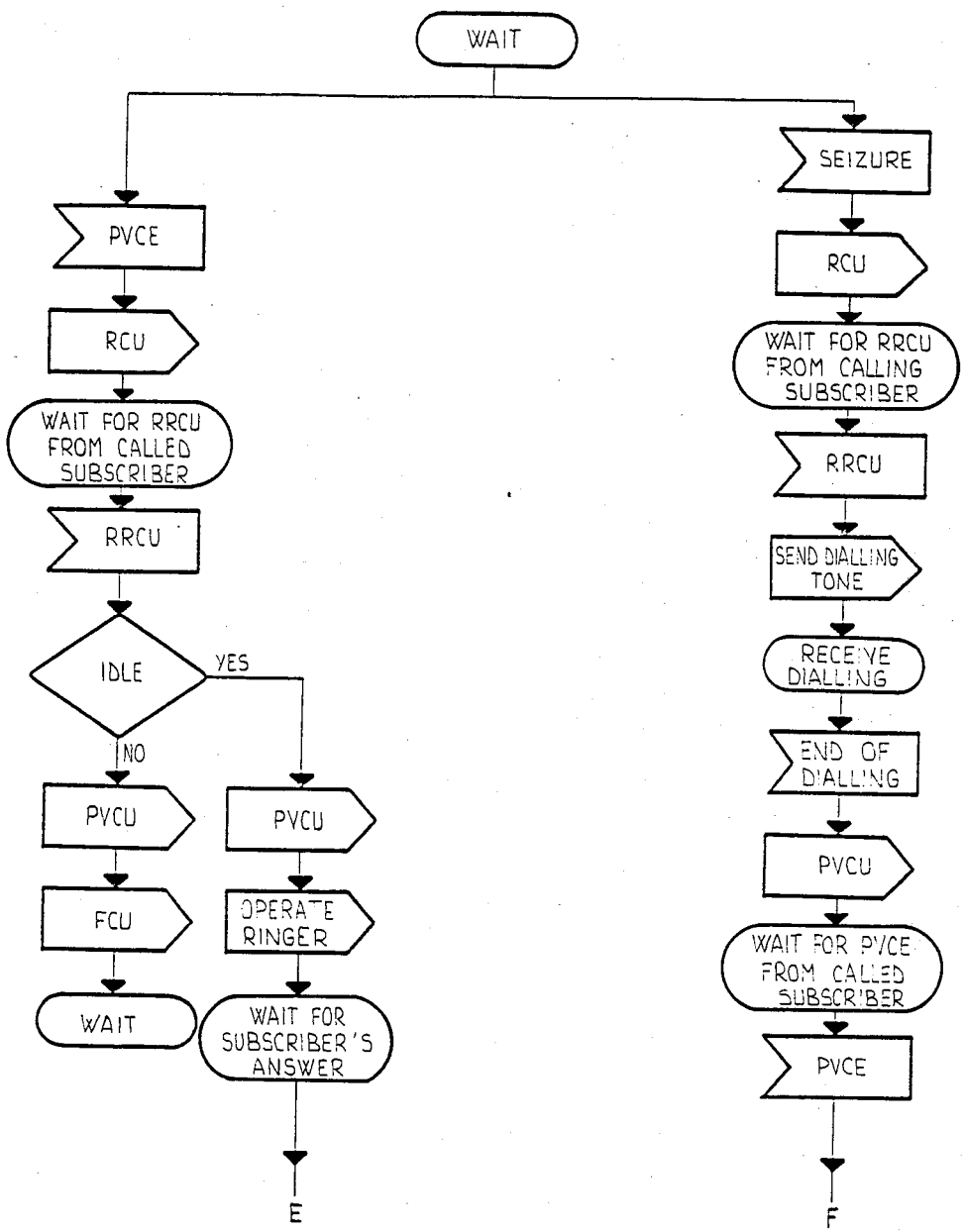
Figure 6B:
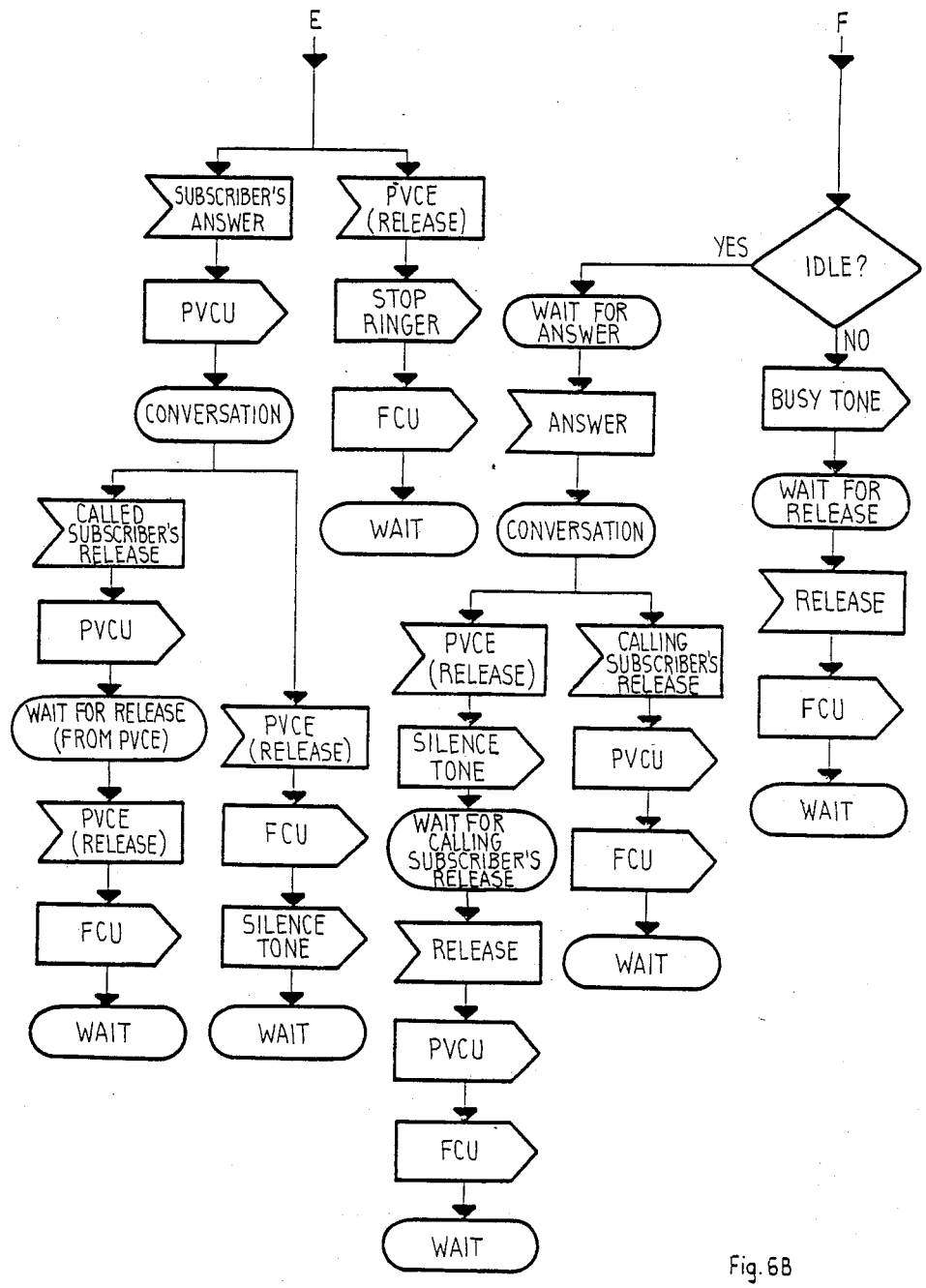

The operations carried out by GV1, GV2 are represented in greater detail in the flow-chart of FIGS. 5, 6.

As to the operations of GV1 the initial state is a "wait" state, which lasts until the arrival of signals RCU and SYNC or FCU. The arrival of RCU or FCU corresponds to the beginning or the end of a call, respectively.

The arrival of RCU is followed by the request from MSC of the line state (SCR), the temporary association between the subscriber and a time slot, the transmission of the booking packets (PTV), and the emission of signal INV. Lastly a flag indicating a booking in progress is set, afterwards the wait state is resumed. These operations have already been described and require no further remarks.

The arrival of FCU is followed by the cancellation of the association between subscriber and time slot in the frame, and then by the return to the wait state.

The operations following the arrival of the signal SYNC are those which are repeated at each frame during a call. The operations relative to the reception are carried out first: the packets are requested to BU3 (FIG. 3) and those relating to telephone calls are recognized in the received ones (PR).

The packets relative to telephone calls can be control (i.e. signalling) packets or actual speech packets. Control packets, if any, are handled first and sent to the higher level (arrow PVCE); speech packets one sent on the contrary to the addresse (arrow OUT CAN N). These operations are repeated until all packets stored in BU3 are received.

Once the reception operations are over, GV1 starts those relating to the transmission, beginning also in this case from the possible packets (PVCU). If there are control packets, GV1 reads in the memory the time slots allotted to the communications said packets refer to, and then proceeds to transmit in the way already examined (arrows PTV, INV).

In the absence of control packets or at the end of the transmission thereof, GV1 prepares to read the speech packets of the possible active channels. When these packets arrive from the subscriber sets (IN CANN) a check is effected to ascertain that the time slot allotted to the channel has not yet been used for control packet transmission.

If the time slot is available, the transmission towards L1 is started (arrows PTV, INV), otherwise the next channel is sensed. Once all the active channels have been handled or in the absence of active channels, GV1 checks whether any booking is in progress. In the negative, the wait state is resumed. In the affirmative GV1 asks ME3 the line state and checks whether the booking has been successful; this is recognized by the presence of signal BOC in ME3 for that channel. If the booking has been successful the association between subscriber and time slot is stored, the flag of "booking in progress" is reset, and an acknowledgment signal (RRCU) is sent to GV2.

In case of collisions the transmission is attempted again in another time slot, repeating the operations already described for the case in which signal RCU has arrived first (obviously, the reading of memory ME3 excepted).

The part of flow chart relating to the bookings takes into account the possibility of a single booking per frame, what is not at all limiting. The modifications necessary to take into account a plurality of bookings are easy for the skilled in the art.

In FIG. 6, device GV2 (FIG. 2) is made to intervene either by the seizure by a subscriber of the station GV2 belongs to or by the arrival of control packets relating to an incoming call (signals PVCE). In case of seizure, signal RCU is emitted, and after the acknowledgment by GV1 (signal RRCU), the operations carried out are the same as those necessary to set up a telephone connection. It is worth noting that the signalling takes place as transmission of control packets by both subscribers. The flow chart is self-explaining and requires no further comments.

In case of incoming calls, after the relative control packets have been received, the signal RCU is emitted to start the access procedure by the called subscriber; after the acknowledgment by GV1, the ringer is operated and the subscriber's answer is waited for. The other operations occur as in a usual telephone call and require no further comments.

As to a data communication the operations carried out by blocks GD1, GD2 (FIG. 2) are quite conventional. In the transmission phase, the data packets processed in SD1 are sent to ID and therefrom, through wires 80 of connection 8, are transferred to buffer memory BU1 till this is full. This condition is signalled to ID through wire 81 of connection 8 (signal BF).

At the same time, whenever ME3 is read by GV2, the signals denoting the instants of beginning and end of the zone available for the data transmission are sent to ME1. These signals, through CC1 and LC1, cause the transfer to IB of the data packets stored in BU1.

The transmission follows the usual procedures required by by the CSMA technique. At the end of each data zone the coincidence with the current instant will stop the transmission. It is clear that by grouping together the speech calls, for instance at the beginning of the frame, the operation of block TD is particularly simple as signals IND will be sent only once per frame.

As to the reception, at the beginning of each frame, interface IB asks memory BU3 for the packets received from L1 (signal PRR transmitted to LC5 through wire 121); the packets are transmitted through wires 120 to ID which discriminates speech and data packets forwarding the latter packets to GD2.

The operations of the devices of blocks TD and ID are also represented in the flow-charts of FIGS. 7, 8, 9, 10.

FIG. 7 relates to the transmission scheduling in TD, and requires no further explanations.

Abbreviation PTD denotes here the data packets to transmit on the line, which are supplied by GD1 and ID.

The scheduling of data packet transmission is identical to that of speech packet transmission, apart from the check on buffer availability, unnecessary for the voice as a maximum for the number of transmissible calls has been set.

Figure 8:
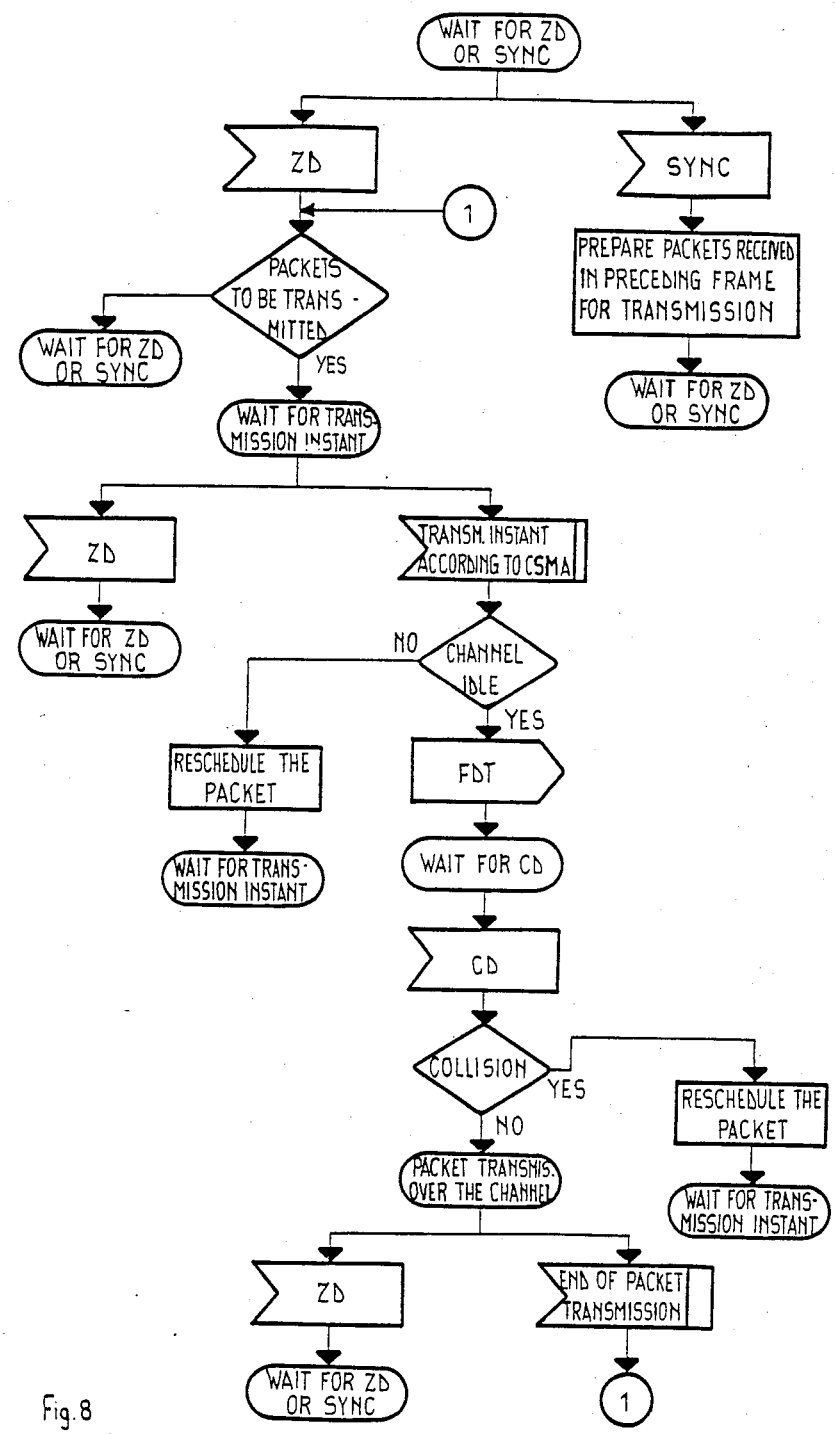

FIG. 8 relates to the actual transmission by TD. The initial state of block TD is a state of wait for the signal of beginning of the data zone (ZD) or for frame synchronism (SYNC). If signal SYNC arrives first, the packets received in the preceding frame are prepared for transmission, whereafter signals ZD or SYNC are waited for again.

If signal ZD arrives first, logic LC1 checks whether there are packets to be sent. In the negative the waiting state is recovered; in the affirmative, the instant established by the CSMA protocol is waited for to start the transmission. In case another signal ZD arrives before that instant (denoting the end of the data zone), the logic reconvers the initial state; otherwise at the instant scheduled for the transmission it senses whether the line is idle.

If the line is sensed busy, the transmission is rescheduled and the transmission instant is waited for again; if the line is sensed idle, the first packet is transmitted and when signal CD arrives from IB, the existence of collisions is checked. In case of collisions, the transmission is rescheduled; if no collisions occurred, the transmission is carried out. Subsequently there is waited for either the signal of end of transmission of the packet (whereby the operations described are repeated) or the end of the data zone, which causes the return to the initial state.

Figure 9:
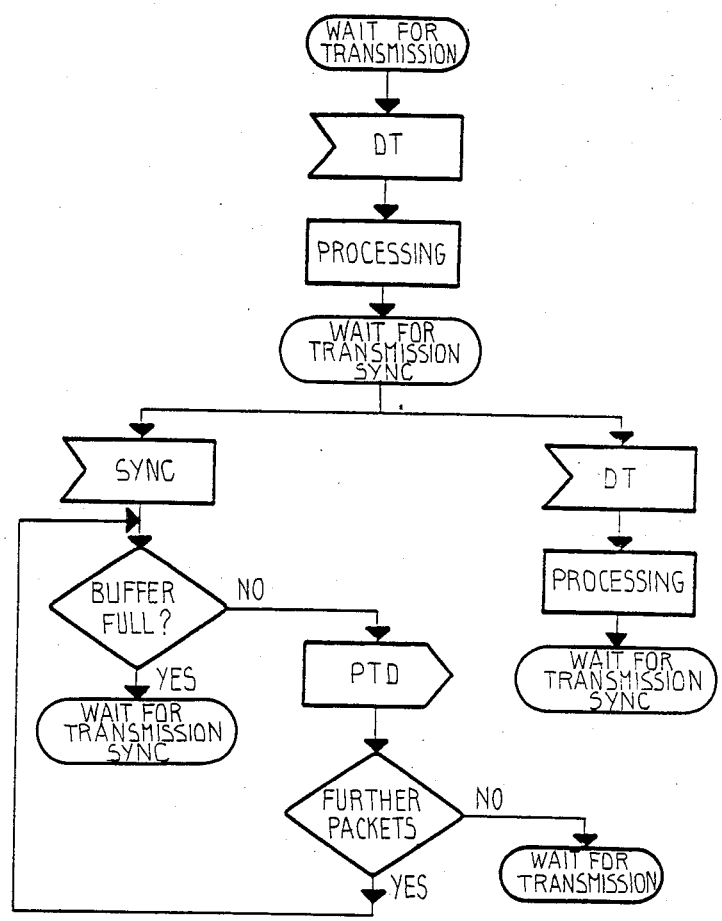

FIG. 9 describes the transmission from ID (FIG. 1) towards L1. Starting from a state of wait for transmission, ID receives from GD1 the data to forward to L1, processes them and waits for the SYNC signal; upon its arrival, it is checked whether or not buffer BU1 is full. If it is not full, the packets (arrow PTD) are sent and the check on the buffer state and the transmission are repeated till all packets have been transmitted (whereafter the initial state is recovered) or till when the buffer is complete (whereafter the "wait for SYNC" state is recovered). In addition, if other data arrive before signal SYNC, they undergo the processing required before being forwarded to the devices of level 1.

As to the reception, the flow-chart of FIG. 10 resumes the operations already described; abbreviations PRR, PR, DR indicate the request for packets to BU1, the reception of the same and the transfer of the data received in GD1.

It is clear that what has been described has been given only by way of example and not in a limiting sense and that variations and modifications are possible without going out of the scope of the invention; in particular, even though reference was made to the speech for the synchronous channel utilization, it is clear that the same method can apply to all transmissions having continuity and synchronism characteristics.

We claim:

1. A process for multiple access random to a transmission line in a local network for speech and data transmission, which network comprises a plurality of stations mutually exchanging information through said lines in packet form, comprising the steps of subdividing station active periods at each station under exclusive control of a local timing system into frames having each a duration equal to a time elapsing between the generation of two subsequent packets relating to speech communication independently of all other stations and, during each said frame, alloting to the speech communications time slots equal to the duration of transmission of a packet which time slots are reserved to said speech communication for their whole duration, thus implementing synchronous communication channels; and forming a map of line occupations by speech communication is built up at each station, wherein for building up said map instants of beginnings of said transmission of said packets of fixed length of speech communications to which a synchronous channel has been allotted, said storage being disabled by collision detection, said synchronous channels in a frame are grouped together, and in that the time intervals not allotted to the speech communications are utilized both for data communications, which do not require the synchronous characteristics to be maintained and for the booking of furhter speech communication by each station, the time slots which may be allotted to speech communication forming a predetermined fraction of a frame duration, the stored instants for each packet being stored only for said allotted time slots.

2. An apparatus for multiple random access to a transmission line in a local network for speech and data transmission which network comprises a plurality of stations mutually exchanging information through said line in packet form, which comprises, in association with each station of the network and at a first hierarchical level (Li), interface devices (1B) for serial reception from and transmission on the line (1), a local time base (BT) connected to said device and subdividing the active periods of the station into frames having durations equal to the time elapsing between the generation of two subsequent packets of a speech communications, devices (RC) connected to said interface devices for the reception and temporary storage of packets addressed to the station, devices (MSC) connected to said time base and to said interface devices for storing at each frame the state of occupation of the line by speech communications, devices (TV, TD) connected to said time base bad said interface devices for managing speech and data packet transmission so that speech packets relating to a same communication are transmitted in corresponding slots defined as synchronous channels in the different frames, whereas data packets and packets for booking new speech communications are transmitted in time intervals not allotted to ongoing speech communications, said devices (TV) designed to manage speech packet transmission being controlled by higher level devices (GV1, GV2) designed to control speech communications, wherein said higher hierarchial level devices for the control of speech communications comprise means for recognizing among the packets received those concerning speech communications and for sending said packet to the subscriber sets (AV) in the station, as well as means adapted to receive from said sets the packets to be transmitted, including and signalling packets, and to forward them to the devices (TV) managing the packet transmission; and means (ID, GD1, GF2) are provided for implementing the higher hierarchical levels of the protocol used for data transmission, which means are also adapted to recognize among the packets receive those relating to data transmission, to forward them to the subscribers sets and to forward the packets to be transmitted, supplied by the subscriber sets to the devices (TD) managing the data packet transmission, wherein said higher hierarchical level devices (GV1, GV2) for the control of speech communication, associate the synchronous channels with the communication so that all the synchronous channels within a frame are grouped together which higher level devices, by utilizing the information contained in the devices (MSC) storing the line occupation state, send the information relating to the time instants at which the transmission is to be effected to the devices (TD, TV) managing the packet transmission, and provide for the association between a speech communication and the time slot allotted thereto in the different frames, said frames being independently established for each station, the stored instants for each packet being stored only for said allotted time slots.

3. Apparatus according to claim 2 wherein said devices (TD, TV) managing the transmission of data and speech packets comprises a first memory (ME1, ME2) wherein there are written by said higher hierarchical level devices (GV1) for the control of speech communications the information (IND, INV) relative to the instants of beginning and end of the time slots available for the transmission of data or speech packets, respectively, a second memory (BU1, BU2) wherein there are temporarily stored the packets to be transmitted, they too supplied by the higher level devices (GD1, GD2 or respectively GV1, GV2) and a coincidence circuit (CC1, CC2) which is inserted between the first and second memory and enables the reading of the second memory when it finds out the coincidence between the current instant, supplied by the time base (BT), and the information stored in the first memory.

4. Apparatus according to claim 2 wherein said devices (MSC) for storing the state of occupation of the line comprise a random access memory (ME3), where at each frame there are written the instants of beginning of speech packet transmission under the control of a logic network (LC6) enabled by a signal denoting the detection of one of said transmission, supplied by a comparator (CM) which compares the duration of transmission of a packet on the line with a predetermined value preset at its interior, the memory contents being read in the subsequent frame by the higher level devices (GV1) for the speech communications control.

5. Apparatus according to claim 4 wherein the instant of beginning of a packet transmission is supplied to said memory (ME3) by a register (RE) storing a bit pattern representative of the current instant, in correspondence with a beginning-of-transmission signal supplied by the devices (IB), for serial reception and transmission, said register having a reset input at which it receives a signal denoting a collision in order to disable the storage.

\* \* \* \* \*